United States Patent
Johansson et al.

(10) Patent No.: US 9,180,883 B2
(45) Date of Patent: Nov. 10, 2015

(54) METHOD AND MODULE FOR DETERMINING OF AT LEAST ONE REFERENCE VALUE FOR A VEHICLE CONTROL SYSTEM

(75) Inventors: Oskar Johansson, Stockholm (SE); Maria Södergren, Segeltorp (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/364,796

(22) PCT Filed: Dec. 22, 2011

(86) PCT No.: PCT/SE2011/051569
§ 371 (c)(1),
(2), (4) Date: Jun. 12, 2014

(87) PCT Pub. No.: WO2013/095234
PCT Pub. Date: Jun. 27, 2013

(65) Prior Publication Data
US 2014/0343819 A1    Nov. 20, 2014

(30) Foreign Application Priority Data
Dec. 22, 2011 (SE) ...................................... 1151248

(51) Int. Cl.
*B60T 7/12* (2006.01)
*G05D 1/00* (2006.01)
(Continued)

(52) U.S. Cl.
CPC .............. *B60W 30/143* (2013.01); *B60K 31/00* (2013.01); *B60K 31/0066* (2013.01);
(Continued)

(58) Field of Classification Search
USPC ...................................................... 701/93–98
See application file for complete search history.

(56) References Cited

U.S. PATENT DOCUMENTS 5,839,534 A    11/1998    Chakraborty et al.
5,931,886 A    8/1999    Moroto et al.
(Continued)

FOREIGN PATENT DOCUMENTS

DE    10 2005 045 891 B3    2/2007
DE    10 2009 030 784 A1    2/2010
(Continued)

OTHER PUBLICATIONS

International Search Report mailed Sep. 7, 2012 in corresponding PCT International Application No. PCT/SE2011/051569.
(Continued)

*Primary Examiner* — Imran Mustafa
(74) *Attorney, Agent, or Firm* — Ostrolenk Faber LLP (57) ABSTRACT

Described is a method for determining a reference value for a vehicle. The method includes: performing a number of simulation cycles $S_j$ each comprising simulation steps: making a first prediction of the vehicle's speed $v_{pred\_cc}$ along the determined horizon with a conventional cruise control; comparing, in a first comparison, the predicted vehicle speed $v_{pred\_cc}$ with $V_{lim1}$ and $V_{lim2}$, which define a motor torque used in a subsequent simulation cycle; making a second prediction of the speed when the engine torque is a value that depends on the result of said comparison in the latest preceding simulation cycle; comparing, in a second comparison, the predicted vehicle speed $v_{pred\_Tnew}$ with $v_{min}$ and $V_{max1}$ which demarcate a range within which the speed is maintained; determining the reference value based on the second comparison and/or the second predicted speed in that simulation cycle $S_j$; and controlling the vehicle according to the reference value.

18 Claims, 3 Drawing Sheets

(51) Int. Cl.
  *G06F 7/00* (2006.01)
  *G06F 17/00* (2006.01)
  *B60W 30/14* (2006.01)
  *B60K 31/00* (2006.01)
  *B60W 50/00* (2006.01)
  *B60W 10/06* (2006.01)
  *B60W 10/11* (2012.01)

(52) U.S. Cl.
  CPC .............. *B60W 10/06* (2013.01); *B60W 10/11* (2013.01); *B60W 50/0097* (2013.01); *B60K 2310/242* (2013.01); *B60W 2540/04* (2013.01); *B60W 2550/143* (2013.01); *B60W 2550/308* (2013.01); *B60W 2550/402* (2013.01); *B60W 2720/10* (2013.01); *Y02T 10/84* (2013.01)

(56) References Cited

U.S. PATENT DOCUMENTS

| | | | |
|---|---|---|---|
| 6,076,036 A | 6/2000 | Price et al. | |
| 6,098,005 A | 8/2000 | Tsukamoto et al. | |
| 6,282,483 B1 | 8/2001 | Yano et al. | |
| 6,782,961 B1 | 8/2004 | Ishikawa et al. | |
| 6,990,401 B2 | 1/2006 | Neiss et al. | |
| 7,103,460 B1 | 9/2006 | Breed | |
| 7,315,804 B2 | 1/2008 | Sato et al. | |
| 8,260,488 B2 | 9/2012 | Ishikawa et al. | |
| 8,620,557 B2 | 12/2013 | Johansson et al. | |
| 8,620,558 B2 | 12/2013 | Johansson et al. | |
| 2003/0221886 A1 | 12/2003 | Petrie, Jr. et al. | 180/170 |
| 2004/0068359 A1* | 4/2004 | Neiss et al. | 701/96 |
| 2004/0149106 A1 | 8/2004 | Hess | |
| 2004/0182652 A1 | 9/2004 | Ammon et al. | |
| 2005/0096183 A1 | 5/2005 | Watanabe et al. | |
| 2005/0273218 A1 | 12/2005 | Breed et al. | |
| 2006/0106521 A1 | 5/2006 | Nasr et al. | |
| 2007/0012013 A1 | 1/2007 | Strosser et al. | |
| 2007/0192013 A1 | 8/2007 | Bando et al. | |
| 2007/0208485 A1 | 9/2007 | Yamamura et al. | |
| 2007/0265759 A1* | 11/2007 | Salinas et al. | 701/93 |
| 2008/0033621 A1 | 2/2008 | Nakamura et al. | |
| 2009/0118918 A1 | 5/2009 | Heap et al. | |
| 2009/0118920 A1 | 5/2009 | Heap et al. | |
| 2010/0049400 A1 | 2/2010 | Duraiswamy et al. | 701/35 |
| 2010/0193616 A1 | 8/2010 | Berger et al. | |
| 2010/0198450 A1 | 8/2010 | Shin | |
| 2011/0106388 A1 | 5/2011 | Boeckenhoff et al. | |
| 2011/0208405 A1 | 8/2011 | Tripathi et al. | |
| 2011/0213540 A1 | 9/2011 | Tripathi et al. | |
| 2011/0276216 A1* | 11/2011 | Vaughan | 701/29 |
| 2012/0150411 A1 | 6/2012 | Oosawa et al. | |
| 2012/0277940 A1 | 11/2012 | Kumar et al. | |
| 2014/0277971 A1 | 9/2014 | Oshiro et al. | |

FOREIGN PATENT DOCUMENTS

| | | |
|---|---|---|
| DE | 10 2008 035 944 A1 | 4/2010 |
| DE | 10 2010 003 428 A1 | 10/2011 |
| EP | 0 838 363 | 4/1998 |
| GB | 2480877 A | 12/2011 |
| JP | 2007-276542 A | 10/2007 |
| WO | WO 2006/107267 A1 | 10/2006 |
| WO | WO 2010/144028 A1 | 12/2010 |
| WO | WO 2010/144030 A1 | 12/2010 |
| WO | WO 2011/126430 A1 | 10/2011 |
| WO | WO 2011/126431 A1 | 10/2011 |
| WO | WO 2011/162705 A1 | 12/2011 |
| WO | WO 2011/162706 A1 | 12/2011 |

OTHER PUBLICATIONS

Erik Hellström et al., "Look-ahead control for heavy trucks to minimize trip time and fuel consumption," Control Engineering Practice, 17(2):245-254, 2009.

Sangjun Park et al., "Predictive Eco-Cruise Control: Algorithm and Potential Benefits," 2011 IEEE Forum on Integrated and Sustainable Transportation Systems (FISTS), pp. 394-399, Vienna, Austria, Jun. 29-Jul. 1, 2011.

International Search Report mailed Sep. 6, 2012 in corresponding PCT International Application No. PCT/SE2011/051568.

International Search Report mailed Sep. 7, 2012 in corresponding PCT International Application No. PCT/SE2011/051578.

International Search Report mailed Sep. 7, 2012 in corresponding PCT International Application No. PCT/SE2011/051575.

International Search Report dated Sep. 13, 2012 issued in corresponding International patent application No. PCT/SE2011/051577.

International Search Report dated Sep. 14, 2012 issued in corresponding International patent application No. PCT/SE2011/051570.

International Search Report mailed Sep. 11, 2012 in corresponding PCT International Application No. PCT/SE2011/051585.

Erik Hellström, "Explicit use of road topography for model predictive cruise control in heavy trucks," Master's thesis performed in Vehicular Systems, ISRN: LiTH-ISY-EX—05/3660—SE, Linköping, Feb. 21, 2005.

Maria Ivarsson, "Fuel Optimal Powertrain Control for Heavy Trucks Utilizing Look Ahead," Linköping Studies in Science and Technology, Thesis No. 1400, ISBN 978-91-7393-637-8, SE, Linköping, 2009.

Office Action mailed Apr. 21, 2015 in U.S. Appl. No. 14/365,361.
Office Action mailed May 6, 2015 in U.S. Appl. No. 14/367,509.
Notice of Allowance mailed Apr. 13, 2015 in U.S. Appl. No. 14/367,465.
Notice of Allowance mailed Apr. 24, 2015 in U.S. Appl. No. 14/365,331.

* cited by examiner

METHOD AND MODULE FOR DETERMINING OF AT LEAST ONE REFERENCE VALUE FOR A VEHICLE CONTROL SYSTEM

CROSS-REFERENCE TO RELATED APPLICATIONS

The present application is a 35 U.S.C. §§371 national phase conversion of PCT/SE2011/051569, filed Dec. 22, 2011, which claims priority of Swedish Application No. 1151248-0, filed Dec. 22, 2011. The contents of both applications are incorporated by reference herein. The PCT International Application was published in the English language.

FIELD OF THE INVENTION

The present invention relates to a module and a method for determining at least one reference value for a control system in a vehicle according to the present disclosure.

BACKGROUND TO THE INVENTION

Cruise control is now usual in motor vehicles, e.g. cars, trucks and buses. An object of cruise control is to achieve a uniform predetermined speed. This is done either by adjusting the engine torque to avoid retardation, or by applying braking action on downhill runs where the vehicle is accelerated by its own weight. A more general object of cruise control is to provide convenient driving and better comfort for the vehicle's driver. A driver of a vehicle equipped with cruise control usually chooses a set speed $v_{set}$ as the speed he/she wishes the vehicle to maintain on level roads. A cruise control then supplies an engine system of the vehicle with a reference speed $v_{ref}$ used for control of the engine. The set speed $v_{set}$ may thus be regarded as an input signal to the cruise control, whereas the reference speed $v_{ref}$ may be regarded as an output signal from the cruise control and is used for control of the engine.

Today's traditional cruise control (CC) maintains a constant reference speed $v_{ref}$ usually set by the vehicle's driver in the form of a set speed $v_{set}$ which is thus here a desired speed chosen for example by him/her, and for today's conventional cruise controls the reference speed is constant and equal to the set speed, i.e. $v_{ref}=v_{set}$. The value of the reference speed $v_{ref}$ changes only when adjusted by the driver while the vehicle is in motion. The reference speed $v_{ref}$ is then sent to a control system which controls the vehicle so that its speed corresponds when possible to the reference speed $v_{ref}$. If the vehicle is equipped with an automatic gearchange system, the gears may be changed by that system on the basis of the reference speed $v_{ref}$ to enable the vehicle to maintain the reference speed $v_{ref}$, i.e. to enable it to maintain the desired set speed $v_{set}$.

In hilly terrain, the cruise control system will try to maintain the set speed $v_{set}$ uphill and downhill. This may result inter alia in the vehicle accelerating over the crest of a hill and into a subsequent downgrade. It will then need to be braked to avoid exceeding the set speed $v_{set}$ or will reach a speed $v_{kfb}$ at which the constant speed brake is activated, which is a fuel-expensive way of driving the vehicle. It may also need to be braked downhill to avoid exceeding the set speed $v_{set}$ or the constant speed brake's activation speed $v_{kfb}$ in cases where the vehicle does not accelerate over the crest of the hill.

To reduce fuel consumption, especially on hilly roads, economical cruise controls such as Scania's Ecocruise® have been developed. This cruise control tries to estimate the vehicle's current running resistance and also has information about its historical running resistance. The economical cruise control may also be provided with map data comprising topographical information. The vehicle is then located on the map, e.g. by means of GPS, and the running resistance along the road ahead is estimated. The vehicle's reference speed $v_{ref}$ can thus be optimised for different types of roads in order to save fuel, in which case the reference speed $v_{ref}$ may differ from the set speed $v_{set}$. This specification refers to cruise controls which allow the reference speed $v_{ref}$ to differ from the set speed $v_{set}$ chosen by the driver, i.e. reference speed-regulating cruise controls.

An example of a further development of an economical cruise control is a "look ahead" cruise control (LACC), a strategic form of cruise control which uses knowledge of sections of road ahead, i.e. knowledge of the nature of the road ahead, to determine the reference speed $v_{ref}$. LACC is thus an example of a reference speed-regulating cruise control whereby the reference speed $v_{ref}$ is allowed, within a certain range, to differ from the set speed $v_{set}$ chosen by the driver, in order to achieve more fuel saving.

Knowledge of the road section ahead may for example comprise information about prevailing topology, road curvature, traffic situation, roadworks, traffic density and state of road. It may further comprise a speed limit on the section ahead, and a traffic sign beside the road. Such knowledge is for example available from location information, e.g. GPS (global positioning system) information, map information and/or topographical map information, weather reports, information communicated between vehicles and information provided by radio. All this knowledge may be used in a variety of ways. For example, information about a speed limit on the road ahead may be used to achieve fuel efficiency by lowering the vehicle's speed before reaching a lower speed limit. Similarly, knowledge of a road sign which indicates for example a roundabout or intersection ahead may also be used to achieve fuel efficiency by braking before the vehicle reaches the roundabout or intersection.

An LACC cruise control does for example make it possible, before a steep upgrade, for the reference speed $v_{ref}$ to be raised to a level above the set speed $v_{set}$, since the vehicle will be expected to lose speed on such a climb owing to high train weight relative to engine performance. Similarly, before a steep downgrade, the LACC cruise control makes it possible for the reference speed $v_{ref}$ to be lowered to a level below the set speed $v_{set}$, since the vehicle will be expected (predicted) to accelerate on such a downgrade owing to its high train weight. The concept here is that reducing the speed at which the vehicle begins the downhill run makes it possible to reduce the energy braked away and/or the air resistance losses (as reflected in the amount of fuel injected before the downgrade). The LACC cruise control may thus reduce fuel consumption without substantially affecting journey time.

In hilly terrain, a reference speed-regulating cruise control, unlike a conventional cruise control, can thus actively vary the vehicle's speed. For example, the vehicle's speed will be reduced before a steep downgrade to enable it to utilise more of the cost-free energy provided by the downgrade, instead of braking it away. The speed may also be increased before a steep climb to prevent the vehicle losing too much speed and time.

A problem with reference speed-regulating cruise controls is that it is difficult for the control system to determine how much the cruise control is to be allowed to vary the reference speed $v_{ref}$.

This is because external parameters, e.g. traffic situation, driver temperament and terrain may also affect the range within which it is appropriate to allow the reference speed $v_{ref}$ to vary in a specific situation. A wider speed range generally results in more fuel saving but also in large speed variations which may be disturbing to surrounding traffic.

In the aforesaid Scania Ecocruise® function there is a tightly specified speed range between the truck's speed limit (which is often 89 km/h) and a lower speed which is 20 km/h below the set speed but never below 60 km/h.

US-2003/0221886 refers to a cruise control in which speed ranges are set. The system can anticipate downgrades and upgrades and incorporate them in the calculations, but the specification gives no details about how this is done in practice.

DE-10 2005 045 891 refers to a cruise control system for a vehicle which sets a range within which the vehicle's speed is allowed to vary. The object is inter alia to cater for the wind conditions to which the vehicle is subject.

JP-2007276542 refers to a cruise control in which the vehicle's speed is allowed to fluctuate relative to a predetermined speed in order to reduce fuel consumption.

SUMMARY OF THE DISCLOSURE

The object of the present invention is to propose an improved module and method for cruise control which take sections of road ahead into account when adjusting the vehicle's speed, and in particular to propose a module and a method which simplify vehicle handling and provide the driver with user-friendly assistance. The present invention relates to a user interface for such a function.

According to an aspect of the present invention, the object described above is at least partly achieved by using the aforesaid module, which is characterised by:
- a horizon unit adapted to determining a horizon for the itinerary by means of map data and location data which comprise route segments with at least one characteristic for each segment;
- a calculation unit adapted to performing, during each of a number of simulation cycles $s_j$ each comprising a number N of simulation steps conducted at a predetermined rate f, the steps of:
  - making a first prediction of the vehicle's speed $v_{pred\_cc}$ along the horizon according to a conventional cruise control when the set speed $v_{set}$ is imparted as a reference speed $v_{ref}$, which first prediction depends on the characteristics of said route segment;
  - doing a first comparison of the first predicted vehicle speed $v_{pred\_cc}$ with at least one of first lower and upper limit values $v_{lim1}$ and $v_{lim2}$ which are used to define an engine torque T for use in the next simulation cycle $s_{j+1}$;
  - making a second prediction of the vehicle's speed $v_{pred\_Tnew}$ along the horizon when the vehicle's engine torque T is a value which depends on the result of said first comparison in the immediately preceding simulation cycle $s_{j-1}$;
  - doing a second comparison of the second predicted vehicle speed $V_{pred\_Tnew}$ with at least one of second lower and upper limit values $v_{min}$ and $v_{max}$ which delineate a range within which the vehicle's speed should be; and
  - determining at least one reference value along the horizon which indicates how the vehicle's speed is to be influenced, on the basis of said second comparison and/or the second predicted vehicle speed $V_{pred\_Tnew}$ in this simulation cycle said set speed being within the range bounded by the second lower and upper limit values $v_{min}$ and $v_{max}$, and
- a providing unit adapted to supplying a control system of the vehicle with said at least one reference value on which the vehicle is then regulated.

According to an aspect of the present invention, the object described above is at least partly achieved by applying the aforesaid method, which is characterised by:
- acquiring a set speed $v_{set}$ for the vehicle;
- determining a horizon for the itinerary by means of map data and location data, which horizon comprises one or more route segments with at least one characteristic for each segment;
- performing, during each of a number of simulation cycles $s_j$ each comprising a number N of simulation steps conducted at a predetermined rate f, the steps of:
  - making a first prediction of the vehicle's speed $v_{pred\_cc}$ along the horizon according to a conventional cruise control when the set speed $v_{set}$ is imparted as a reference speed $v_{ref}$, which first prediction depends on the characteristics of said route segment;
  - doing a first comparison of the first predicted vehicle speed $v_{pred\_cc}$ with at least one of first lower and upper limit values $v_{lim1}$ and $v_{lim2}$ which are used to define an engine torque T for use in the next simulation cycle $s_{j+1}$;
  - making a second prediction of the vehicle's speed $v_{pred\_Tnew}$ along the horizon when the vehicle's engine torque T is a value which depends on the result of said first comparison in the immediately preceding simulation cycle $s_{j-1}$;
  - doing a second comparison of the second predicted vehicle speed $v_{pred\_Tnew}$ with at least one of second lower and upper limit values $v_{min}$ and $v_{max}$ which delineate a range within which the vehicle's speed should be; and
  - determining at least one reference value along the horizon which indicates how the vehicle's speed is to be influenced, on the basis of said second comparison and/or the second predicted vehicle speed $v_{pred\_Tnew}$ in this simulation cycle $s_j$, said set speed being within the range bounded by the second lower and upper limit values $v_{min}$ and $v_{max}$, and
- a providing unit adapted to supplying a control system of the vehicle with said at least one reference value on which the vehicle is then regulated.

The vehicle's fuel consumption can be minimised by regulating according to the invention, since it takes into account information about the vehicle's itinerary. Map data, e.g. in the form of an on-board database with altitude information, and a positioning system, e.g. GPS, provide information about road topography along the itinerary which can be used in determining the at least one reference value. The control system is then supplied with the at least one reference value and proceeds to regulate the vehicle according to these one or more reference values.

Applying a method which defines the limits for the magnitude of the reference value, i.e. which defines the lower and upper limit values $v_{min}$ and $v_{max}$ which delineate the range within which the vehicle's speed should be, results in a predictable and robust way of quickly calculating reference values for use by one or more of the vehicle's control systems.

According to the present invention, the driver can manually set a set speed $v_{set}$ and the range, i.e. the lower and upper limit values $v_{min}$ and $v_{max}$ relative to the set speed $v_{set}$ between which the cruise control is actively allowed to function. The lower and upper limit values $v_{min}$ and $v_{max}$ may, according to an embodiment, be related to the set speed $v_{set}$. This relationship takes the form, according to various embodiments, of a percentage of the set speed $v_{set}$ or a predetermined speed value, e.g. a predetermined number of km/h related to the set speed $v_{set}$. Various predefined range widths may also be selectable by the driver.

These embodiments make setting the cruise control's parameters very user-friendly. By one or two very simple inputs the driver can determine how the vehicle's speed is to be controlled.

According to an embodiment of the invention, the range, i.e. the lower and upper limit values $v_{min}$ and $v_{max}$, is determined automatically. This setting is based on calculations of appropriate range width, which may for example take into account the length of a time gap to a vehicle in front so that the range is narrower for a short time gap and wider for a longer time gap.

The automatic setting of the range means that the driver can devote full attention to the road ahead instead of making inputs to the cruise control system, which does of course make driving the vehicle safer.

Preferred embodiments of the invention are described herein.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
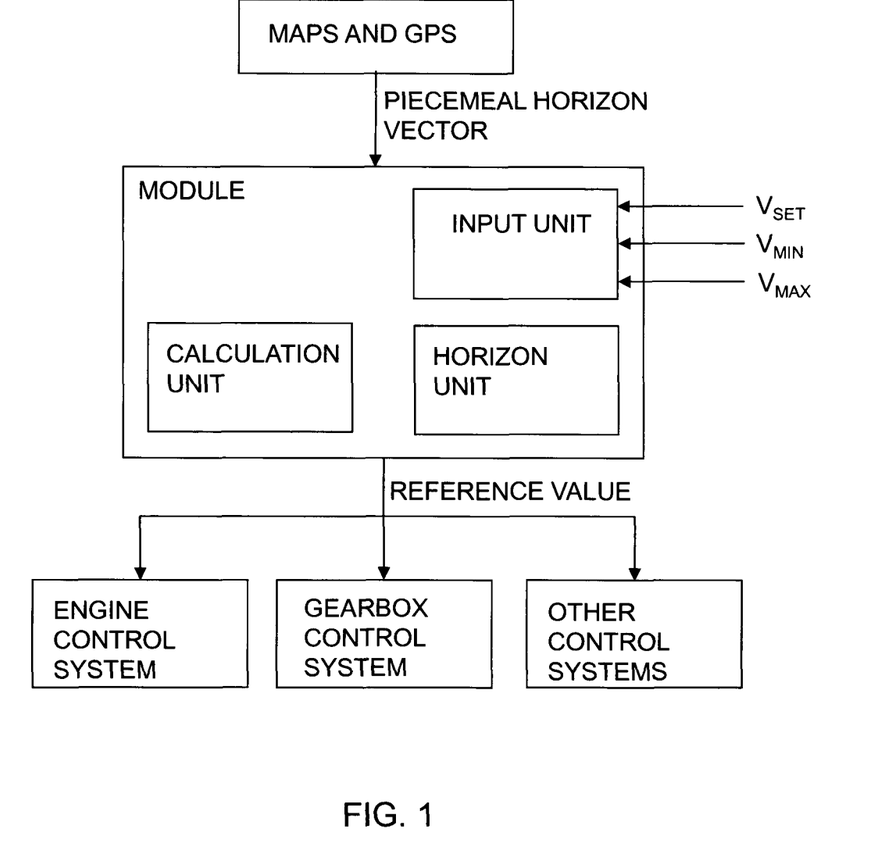
FIG. 1 depicts a regulating module according to an embodiment of the invention.

FIG. 1 depicts a module for controlling a vehicle's speed according to an aspect of the invention. The module comprises an input unit adapted to receiving a desired speed, i.e. a set speed $v_{set}$, for the vehicle. The driver may for example set a speed $v_{set}$ which he/she wishes the vehicle to maintain. The input unit may also be adapted to receiving input values for the second lower limit value $v_{min}$ and for the second upper limit value $v_{max}$. The module comprises also a horizon unit adapted to determining a horizon H for the itinerary by means of map data and location data. The horizon H is made up of route segments with at least one characteristic for each segment. A possible example of characteristics of segments is their gradient α, in radians.

The description of the present invention states that GPS (global positioning system) is used to determine location data for the vehicle, but specialists will appreciate that other kinds of global or regional positioning systems are conceivable to provide these data. Such positioning systems might for example use radio receivers to determine the vehicle's location. The vehicle might also use sensors to scan the surroundings and thereby determine its location.

FIG. 1 illustrates how the module is provided with information about the itinerary from maps (map data) and GPS (location data). The itinerary is sent to the module bit by bit, e.g. via CAN (controller area network) bus. The module may be separate from or be part of the one or more control systems which are to use reference values for regulating. An example of such a control system is the vehicle's engine control system. The control system may also be any other appropriate control system of the vehicle, e.g. cruise control, gearbox control system or other control systems. A horizon is usually put together for each control system, since the control systems regulate on different parameters. Alternatively, the unit which handles maps and positioning systems may be part of a system which is to use reference values for regulating. In the module, the bits of the itinerary are then put together in a horizon unit to construct a horizon and are processed by the processor unit to create an internal horizon on which the control system can regulate. The horizon is then continually supplemented by new bits of itinerary from the unit with GPS and map data, to maintain a desired length of horizon. The horizon is thus updated continuously when the vehicle is in motion.

CAN is a serial bus system specially developed for use in vehicles. The CAN data bus makes digital data exchange possible between sensors, regulating components, actuators, control devices etc., and provides assurance that two or more control devices can have access to the signals from a given sensor in order to use them to control components connected to them. Each of the connections between the units illustrated in FIG. 1 may take the form of one or more from among a cable, a data bus, e.g. a CAN (controller area network) bus, an MOST (media orientated systems transport) bus, or some other bus configuration, or a wireless connection.

The module comprises also a calculation unit adapted to, during a number of simulation cycles $s_j$ each comprising a number N of simulation steps which are conducted at a predetermined rate f, in each simulation cycle make a first prediction of the vehicle's speed $v_{pred\_cc}$ along the horizon according to a conventional cruise control when the desired speed $v_{set}$ is imparted as a reference speed $v_{ref}$, which first prediction depends on the characteristics of said route segment. A first comparison is also done between the first predicted vehicle speed $v_{pred\_cc}$ and first lower and upper limit values $v_{lim1}$ and $v_{lim2}$ which are used to define an engine torque T for use in the next simulation cycle $s_{j+1}$.

A second prediction of the vehicle's speed $v_{pred\_Tnew}$ along the horizon is then made on the basis of a vehicle engine torque T which depends on the result of said first comparison in the immediately preceding simulation cycle $s_{j-1}$. This simulation cycle $s_j$ thus here uses the first comparison in the preceding simulation cycle $s_{j-1}$ when the second prediction of the vehicle speed $v_{pred\_Tnew}$ is made in this simulation cycle $s_j$.

In a second comparison, the second predicted vehicle speed $v_{pred\_Tnew}$ is then compared with second lower and upper limit values $v_{min}$ and $v_{max}$ which delineate a range within which the vehicle's speed should be. This is followed by determining at least one reference value which indicates how the vehicle's speed is to be influenced on the basis of said second comparison and/or the second predicted vehicle speed $v_{pred\_Tnew}$ in this simulation cycle $s_j$. According to the present invention, the second lower and upper limit values $v_{min}$ and $v_{max}$ are determined so that the set speed $v_{set}$ is within the range bounded by these limit values. How these limit values are determined according to various embodiments of the invention will be described in more detail below.

The module is further arranged to supply, e.g. by sending, to a control system of the vehicle said at least one reference value on which the vehicle is then regulated.

The module and/or the calculation unit comprise at least a processor and a memory unit which are adapted to making all the calculations, predictions and comparisons of the method according to the invention. Processor means here a processor or microcomputer, e.g. a circuit for digital signal processing (digital signal processor, DSP), or a circuit with a predetermined specific function (application specific integrated circuit, ASIC). The calculation unit is connected to a memory unit which provides it with, for example, the stored programme code and/or stored data which the calculation unit needs to enable it to do calculations. The calculation unit is also adapted to storing partial or final results of calculations in the memory unit.

The method for control of vehicle speed according to the present invention and its various embodiments may also be implemented in a computer programme which, when executed in a computer, e.g. the aforesaid processor, causes the computer to apply the method. The computer programme usually takes the form of a computer programme product stored on a digital storage medium, and is contained in a computer programme product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 2:
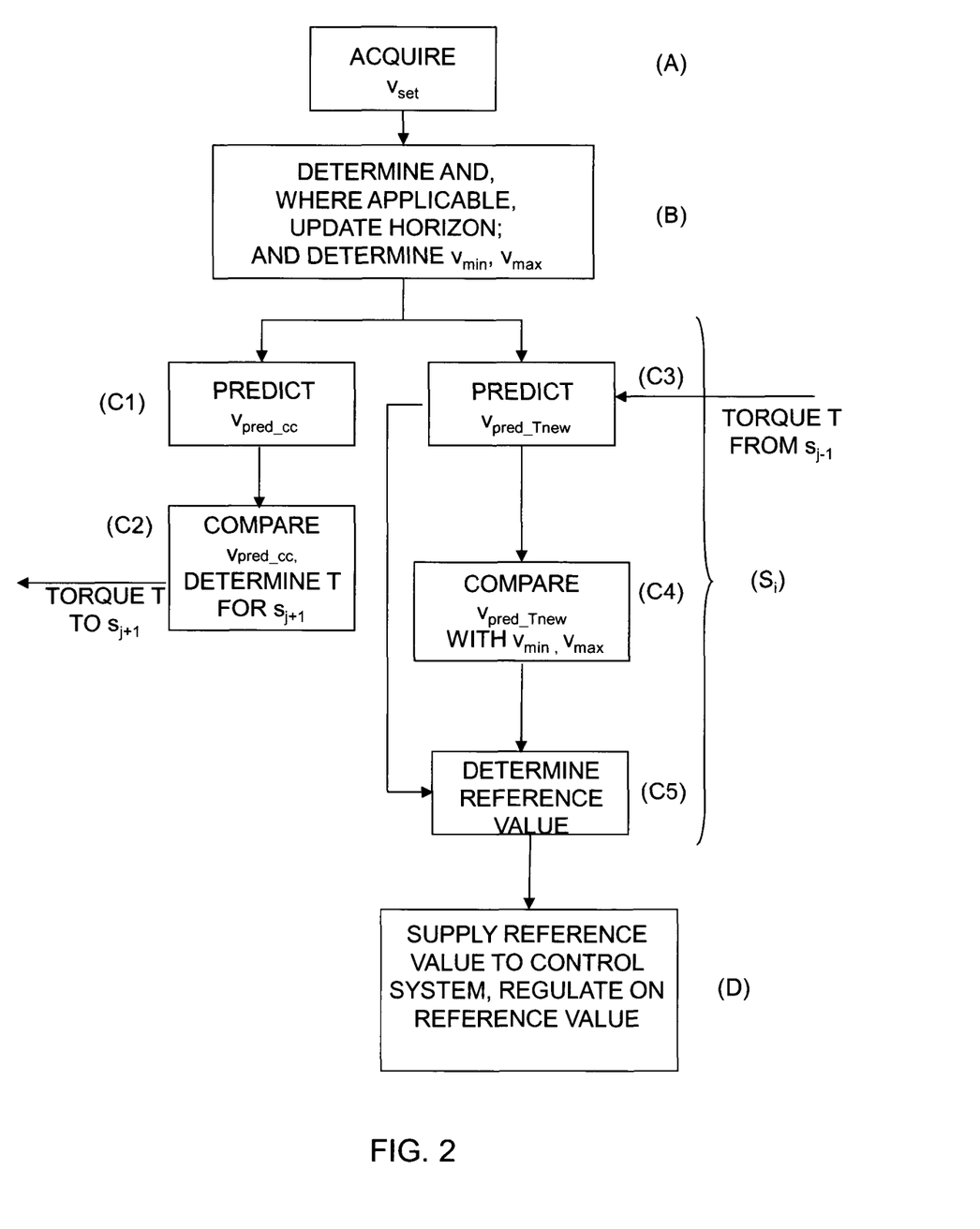
FIG. 2 is a flowchart for the steps which the module is arranged to perform according to an embodiment of the invention.

FIG. 2 is a flowchart for the steps of the method for controlling the vehicle's speed according to an embodiment of the invention. The method comprises a first step A) of acquiring $v_{set}$ as a desired set speed which the vehicle is to maintain, and a second step B) of determining a horizon for the itinerary by means of map data and location data comprising route segments with at least one characteristic for each segment, and the lower and upper limit values $v_{min}$ and $v_{max}$, so that the set speed $v_{set}$ is within the range bounded by them. These limit values may here be determined on the basis of driver input and/or be determined automatically on the basis of parameters such as time gaps to vehicles ahead. This will be described in more detail below.

According to the method, a number of simulation cycles are then done along the length of the horizon. A simulation cycle $s_j$ comprises a number N of simulation steps conducted at a predetermined rate f, and the following steps are performed during a simulation cycle $s_j$:

C1) Making a first prediction of the vehicle's speed $v_{pred\_cc}$ along the horizon according to a conventional cruise control when the desired speed $v_{set}$ is imparted as a reference speed $v_{ref}$, which first prediction depends on the characteristics of said route segment.

C2) Doing a first comparison of the first predicted vehicle speed $v_{pred\_cc}$ with first lower and upper limit values $v_{lim1}$ and $v_{lim2}$ which are used to define an engine torque T for use in the next simulation cycle $s_{j+1}$.

C3) Making a second prediction of the vehicle's speed $v_{pred\_Tnew}$ along the horizon when the vehicle's engine torque T depends on the result of said first comparison in the immediately preceding simulation cycle $s_{j-1}$. During a simulation cycle $s_j$ the prediction according to C1) and the prediction according to C3) are thus made in parallel as illustrated in FIG. 2. The result of the first comparison of the first predicted vehicle speed $v_{pred\_acc}$ with first lower and upper limit values $v_{lim1}$ and $v_{lim2}$ in the immediately preceding simulation cycle $s_{j-1}$ determines the torque T to be used in making the second prediction of the vehicle's speed $v_{pred\_Tnew}$ during this simulation cycle $s_j$.

C4) Doing a second comparison of the second predicted vehicle speed $v_{pred\_Tnew}$ with the second lower and upper limit values $v_{min}$ and $v_{max}$ determined at step B) which delineate a range within which the vehicle's speed should be and which comprises the set speed $v_{set}$.

C5) determining at least one reference value which indicates how the vehicle's speed is to be influenced, on the basis of said second comparison and/or the second predicted vehicle speed $v_{pred\_Tnew}$ in this simulation cycle $s_j$.

This simulation cycle $s_j$ thus comprises steps C1-C5. The amount of time required for a simulation cycle $s_j$ depends on the rate f. If all five steps C1-C5 are performed at a rate of 5 Hz, this simulation cycle $s_j$ will take 1 second.

As a further step D) said at least one reference value is then supplied, e.g. by being sent via a CAN bus, to a control system of the vehicle in which it is used to regulate the vehicle's speed according to said at least one reference value.

The method according to the present invention results in a constant and predetermined processor load when determining this at least one reference value, so the driver can easily set how these reference values are determined by single inputs in the system.

The set speed $v_{set}$ is thus the driver's input signal related to a desired cruise control speed, and the at least one reference value is the value on which the vehicle is regulated. The at least one reference value is preferably a reference speed $v_{ref}$, a reference torque $T_{ref}$ or a reference engine speed $\omega_{ref}$.

The reference speed $v_{ref}$ is imparted to the speed regulator of the engine control unit. In traditional cruise control, as mentioned above, the reference speed $v_{ref}$ is equal to the set speed, i.e. $v_{ref} = v_{set}$. The speed regulator then controls the vehicle's speed on the basis of the reference speed $v_{ref}$ by demanding necessary torque from the engine's torque regulator. According to the embodiment in which the at least one reference value is a reference torque $T_{ref}$, it may be sent directly to the engine's torque regulator. In the embodiment where the at least one reference value is a reference engine speed $\omega_{ref}$, it may be sent directly to the engine's speed regulator.

By using information about its itinerary, a vehicle's reference speed $v_{ref}$ to the speed regulator can be regulated to cater for saving fuel, enhancing safety and improving comfort. As specialists will appreciate, other reference values to other control systems may also be regulated. The topography greatly affects the control in particular of the power train of heavy vehicles, since much more torque is required to travel uphill than downhill and to travel up steep hills without changing gear.

According to the present invention, reference values can be determined in a computationally efficient way. The module adapted to applying the method according to the invention may also be part of a control system whose reference values it is intended to regulate, but may also be a freestanding module separate from the control system.

The itinerary is herein exemplified as a single itinerary for the vehicle, but specialists will appreciate that various conceivable itineraries may be covered by information from maps and GPS or some other positioning system. The driver may also for example register the intended journey's starting and destination points, whereupon the unit will use map data etc. to work out an appropriate route.

According to an embodiment of the present invention, the second predicted vehicle speed $v_{pred\_Tnew}$ has to be within the range bounded by the second lower and upper limit values $v_{min}$ and $v_{max}$. This means that the at least one reference value, which may be a reference speed $v_{ref}$, will be within a range bounded by these limit values, i.e. $v_{min} \leq v_{ref} \leq v_{max}$. The range comprises also the set speed $v_{set}$ since the range is itself relative to the set speed, ie $v_{min} \leq v_{set} \leq v_{max}$. The reference value to be used later by the vehicle's control system may thus be allowed to vary within this range when the regulating module predicts an internal horizon for the vehicle's speed.

According to another embodiment of the present invention, the second predicted vehicle speed $v_{pred\_Tnew}$ may be allowed to be at least partly outside the range bounded by the second lower and upper limit values $v_{min}$ and $v_{max}$.

For example, in certain situations, e.g. on a steep upgrade where the vehicle will lose speed, the predicted vehicle speed $v_{pred\_Tnew}$ may reduce the retardation as much as possible in order to cause the second predicted vehicle speed $v_{pred\_Tnew}$ to be below or equal to the second upper limit value $v_{max}$ and be below or equal to a further lower limit value $V_{min2}$. The vehicle's speed is thus here raised before the climb so that it loses less speed uphill.

In other words, the regulation tries to keep the vehicle speed within the range bounded by the lower and upper limit values $v_{min}$ and $v_{max}$, but the initial speed at the beginning of the climb can be adjusted according to the invention, resulting in a more constant vehicle speed than in the case of a conventional cruise control, e.g. on hilly roads where the vehicle may well be retarded and/or accelerated by its train weight.

It is advantageous to be able to allow a driver to alter speed ranges, since different drivers have different degrees of acceptance of how large the speed range should be. Such factors as type of road, e.g. number of traffic lanes, size of road, tight bends and steep hills may also affect driver acceptance of the speed range.

The driver's temperament may also affect his/her acceptance of the size of the speed range, e.g. stress may adversely affect willingness to reduce speed when approaching a downgrade, since this might be seen as losing journey time.

Large train weight for example may also cause the driver to want a large speed range in order to increase the system's potential for savings.

According to the present invention, the driver may use the input unit to manually set a set speed $v_{set}$ and the range, i.e. the second lower and upper limit values $v_{min}$ and $v_{max}$, relative to the set speed $v_{set}$ within which the cruise control is actively allowed to function. The limits of the range are preferably set by one or more buttons in the steering wheel or on the instrument panel.

Various predefined range widths may also be selectable by the driver. If a single button is used for the input, various levels with different range widths may be stepped through by pressing the button repeatedly. The various range widths are preferably presented on a display. If instead the input unit comprises a number of buttons, one of them may be used to set the lower limit value $v_{min}$ and another to set the upper limit value $v_{max}$. These buttons are preferably situated on the input unit close to a button or the like which is used to input the set speed $v_{set}$. Specialists will appreciate that substantially any appropriate devices may be used for these inputs, e.g. buttons, levers, knobs, touch screens, menu choice devices etc.

The lower and upper limit values $v_{min}$ and $v_{max}$ may, according to an embodiment of the invention, be related to the set speed $v_{set}$.

According to a non-limitative example of using levels related to the set speed $v_{set}$, the driver adopts a set speed $v_{set}$ of 80 km/h, and a level as for example defined below in terms of respective lower and upper relativities in km/h to the set speed:

| Level | Lower rel. | Upper rel. | $v_{min}$ | $v_{max}$ |
|---|---|---|---|---|
| 1 | −5 km/h | +2 km/h | $v_{set}$−5 = 75 km/h | $v_{set}$+2 = 82 km/h |
| 2 | −7 km/h | +4 km/h | $v_{set}$−7 = 73 km/h | $v_{set}$+4 = 84 km/h |
| 3 | −10 km/h | +6 km/h | $v_{set}$−10 = 70 km/h | $v_{set}$+6 = 86 km/h |

If in this example the driver chooses level 1, it means that the reference speed $v_{ref}$ is allowed to vary between 75 and 82 km/h.

For the range bounded by the second lower and upper limit values $v_{min}$ and $v_{max}$ there is therefore, according to an embodiment, a predetermined number of different levels which have different range widths related to the set speed $v_{set}$. Here the relativities between the set speed $v_{set}$ and the second lower and upper limit values $v_{min}$ and $v_{max}$ are respective first and second predetermined numbers of km/h below and above the set speed $v_{set}$.

According to another embodiment, the relativities between the set speed $v_{set}$ and the lower and upper limit values $v_{min}$ and $v_{max}$ are respective first and second predetermined percentages below and above the set speed $v_{set}$. According to this embodiment, these limit values may differ by 2 to 20%, and preferably 4 to 15%, from the value of the set speed $v_{set}$.

According to a non-limitative example of using levels related to the set speed $v_{set}$, the driver adopts a set speed $v_{set}$ of 80 km/h, and a level as for example defined below in terms of lower and upper relativities in percent to the set speed $v_{set}$.

| Level | Lower rel. | Upper rel. | $v_{min}$ | $v_{max}$ |
|---|---|---|---|---|
| 1 | −15% | +0% | $v_{set}$−12 km/h | $v_{set}$+0 km/h |
| 2 | −10% | +2% | $v_{set}$−8 km/h | $v_{set}$+1.6 km/h |
| 3 | −5% | +5% | $v_{set}$−4 km/h | $v_{set}$+4 km/h |

If in this example the driver chooses level 1, it means that the reference speed $v_{ref}$ is allowed to vary between 68 and 80 km/h.

These embodiments in which there are various predefined levels for range widths make setting the cruise control's parameters very user-friendly. By one or two very simple inputs, the driver can here determine how the vehicle's speed is to be controlled.

According to an embodiment of the present invention, the lower and upper limit values $v_{min}$ and $v_{max}$ may be set independently of one another.

According to an embodiment of the invention, the range, i.e. the lower and upper limit values $v_{min}$ and $v_{max}$, is determined automatically. This setting is based on calculations of appropriate range widths. If for example the vehicle also has an adaptive cruise control (autonomous intelligent cruise control, AICC) which makes it possible to set a time gap relative to vehicles ahead, this time gap may also be catered for in the above choice of level. In such cases a shorter time gap is related to a level with a small speed range (small range width) and a longer time gap to levels which allow larger speed variations (large range width).

The automatic setting of the range means that the driver can devote full attention to the road ahead instead of making inputs to the cruise control system, which does of course make driving the vehicle safer.

The ways described above of determining the range width make it possible for the range which bests suits the driver, the traffic situation and the terrain to be always achieved when determining the reference values. If both AICC and range choice by levels are available, the same button may preferably be used to select both. Moreover, the driver is able to influence the system, thereby increasing his/her acceptance of this function and willingness to use the system as an aid to driving the vehicle.

A so-called retarder cruise control (constant speed brake) of the vehicle is also acted upon by the controls according to the present invention, since the limit value $v_{kfb}$ for when the constant speed brake is activated is always higher than the range determined according to this invention, i.e. above the range bounded by the lower and upper limit values $v_{min}$ and $v_{max}$.

Figure 3:
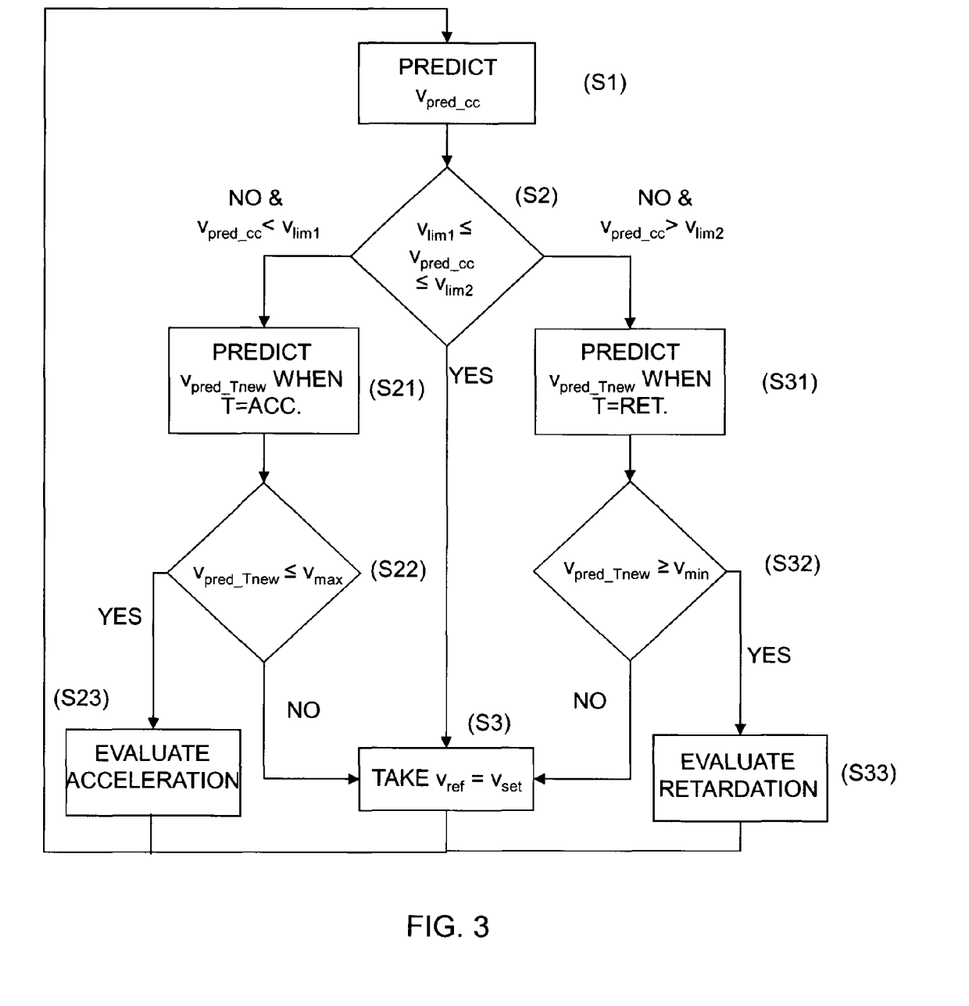
FIG. 3 is a flowchart for the steps which the module is arranged to perform according to an embodiment of the invention.

FIG. 3 is a flowchart illustrating schematically in more detail how the second lower and upper limit values $v_{min}$ and $v_{max}$ and the range defined by them are used in determining the at least one reference value. The diagram shows the first predicted speed $v_{pred\_cc}$ being predicted as a first step S1. When it has been predicted for N steps, the first predicted speed $v_{pred\_cc}$ is compared with at least one of the first lower and upper limit values $v_{lim1}$ and $v_{lim2}$, as depicted at a second step S2. If the first predicted speed $v_{pred\_cc}$ is below the first lower limit value $v_{lim1}$ an upgrade is identified, but if it is above the first upper limit value $v_{lim2}$ a downgrade is identified.

If an upgrade is identified, i.e. if the first predicted speed $v_{pred\_cc}$ is below the first lower limit value $v_{lim1}$, the vehicle's engine torque T in the prediction of the second predicted vehicle speed $v_{pred\_Tnew}$ is taken as a torque which accelerates the vehicle (e.g. a maximum torque) in the next simulation cycle $s_{j+1}$, as illustrated at step S21 in FIG. 3. This does however presuppose that the first predicted speed $v_{pred\_cc}$ was below the first lower limit value $v_{lim1}$ before, where applicable, being above the first upper limit value $v_{lim2}$.

If on the contrary a downgrade is identified, i.e. if the first predicted speed $v_{pred\_cc}$ is above the first upper limit value $v_{lim2}$, the vehicle's engine torque T in the prediction of f the second predicted vehicle speed $v_{pred\_Tnew}$ is taken as a torque which retards the vehicle (e.g. a minimum torque) in the next simulation cycle $s_{j+1}$, as illustrated at step S31 in FIG. 3. This does however presuppose that the first predicted speed $v_{pred\_cc}$ was above the first upper limit value $v_{lim2}$ before, where applicable, it becomes lower than the first lower limit value $v_{lim1}$. According to an embodiment, the calculation unit explained above with reference to FIG. 1 is adapted to doing the calculations and comparisons here described.

According to a preferred embodiment of the invention described above, if a hill is identified by the analysis described above of the first predicted speed $v_{pred\_cc}$, specific rules are applied to determine which one or more reference values the vehicle is to be regulated on. According to this embodiment, the calculation unit is adapted to using rules for determining the at least one reference value.

According to an embodiment of the invention, the second predicted vehicle speed $v_{pred\_Tnew}$ is compared with the respective second lower and upper limit values $v_{min}$ and $v_{max}$ which define a range within which the vehicle's speed should be. These comparisons are done at steps S22 and S32 in FIG. 3.

According to an embodiment of the invention, such a rule is that if the second predicted vehicle speed $v_{pred\_Tnew}$ is within the range defined by the second lower and upper limit values, i.e. if $v_{min} \leq v_{pred\_Tnew} \leq v_{max}$, the method moves on to steps S23 and S33 respectively, in which the vehicle's imparted reference value is determined as a value which represents the second predicted speed $v_{pred\_Tnew}$. It is thus possible to ensure that the vehicle's speed will not be above or below the respective speed limits defined by the second lower and upper limit values $v_{min}$ and $v_{max}$.

If the second predicted vehicle speed $v_{pred\_Tnew}$ is predicted with an accelerating torque at step S21, it is then compared with the second upper limit value $v_{max}$ as a step S22. According to an embodiment of the invention, if the second predicted speed $v_{pred\_Tnew}$ is below or equal to the second upper limit value $v_{max}$, it is to be imparted as reference value at step S23. The second predicted speed $v_{pred\_Tnew}$ is then preferably imparted as reference value at the time P1 when the first predicted speed $v_{pred\_cc}$ is below the first lower limit value $v_{lim1}$, provided that the second predicted vehicle speed $v_{pred\_Tnew}$ is predicted not to exceed the second upper limit value $v_{max}$.

In a similar way, the second predicted vehicle speed $v_{pred\_Tnew}$ is compared with the second lower limit value $v_{min}$ as a step S32 if it is predicted on the basis of a retarding torque. According to an embodiment of the invention, if the second predicted vehicle speed $v_{pred\_Tnew}$ is above or equal to the second lower limit value $v_{min}$, the reference value which resulted in the second predicted vehicle speed $v_{pred\_Tnew}$ is to be imparted at step S33. The second predicted vehicle speed $v_{pred\_Tnew}$ is thus preferably imparted at the time when the first predicted speed $v_{pred\_cc}$ is above the second upper limit value $v_{max}$, provided that the second predicted speed $v_{pred\_Tnew}$ is predicted not to be below the second lower limit value $v_{min}$.

At step S33, according to an embodiment, the reference speed $v_{ref}$ is determined to a value which represents the second predicted vehicle speed $v_{pred\_Tnew}$ if on the basis of a retardation the latter exceeds the second limit value $v_{min}$ and also exceeds a further upper limit value $v_{max2}$, or is equal either to the second lower limit value $v_{min}$ or to the further upper limit value $v_{max2}$ which is related to a set speed $v_{set}$. According to an embodiment, the further upper limit value $v_{max2}$ corresponds to the set speed plus a constant $c_1$, i.e. $v_{max2} = v_{set} + c_1$. According to another embodiment, the further upper limit value $v_{max2}$ corresponds to a factor $c_1$ multiplied by the set speed, i.e. $v_{max2} = v_{set} * c_1$. This factor $c_1$ may for example have the value 1.02, meaning that the further upper limit value $v_{max2}$ is 2% higher than the set speed $v_{set}$.

At step S23, according to an embodiment, the reference speed $v_{ref}$ is determined to a value which corresponds to the second predicted vehicle speed $v_{pred\_Tnew}$ based on an acceleration, if this second predicted speed so based is below the second upper limit value $v_{max}$ and is also below a further lower limit value $v_{min2}$, or is equal to the second upper limit value $v_{max}$ or the further lower limit value $v_{min2}$ which is related to a set speed. According to an embodiment, the further lower limit value $v_{min2}$ corresponds to the set speed minus a constant $c_2$, i.e. $v_{min2} = v_{set} - c_2$. According to another embodiment, the further lower limit value $v_{min2}$ corresponds to a factor $c_2$ multiplied by the set speed $v_{set}$, i.e. $v_{min2} = v_{set} * c_2$. This factor $c_2$ may for example have the value 0.98, meaning that the further upper limit value $v_{max2}$ is 2% lower than the set speed $v_{set}$.

According to an embodiment of the invention, the simulations done according to the method of the invention are evaluated by using cost functions. This involves calculating the cost for the second predicted vehicle speed $v_{pred\_Tnew}$ and/or a third predicted vehicle speed $v_{pred\_Tk+new}$. In other words, the costs are here calculated for these two different simulated modes of driving. This evaluation involves using at least one cost function $J_{Tnew}$, $J_{Tk+new}$ which are based on calculations of at least one from among a speed profile v, an energy consumption E and a journey time t.

The respective cost functions $J_{Tnew}$ and $J_{Tk+new}$ may here be determined for the second predicted vehicle speed $v_{pred\_Tnew}$ and a third predicted vehicle speed $v_{pred\_Tk+new}$ by weighting their respective energy reductions and journey time reductions relative to the first predicted vehicle speed $v_{pred\_cc}$ with said weighting parameter β.

The cost functions $J_{Tnew}$ and $J_{Tk+new}$ for the second predicted vehicle speed $v_{pred\_Tnew}$ and for a third predicted vehicle speed $v_{pred\_Tk+new}$ may then be subjected to a fourth comparison on the basis of which the reference value on which the vehicle is to be regulated is then determined.

The present invention is not restricted to the embodiments described above. Various alternatives, modifications and equivalents may be used. The aforesaid embodiments therefore do not limit the invention's scope which is defined by the attached claims.

The invention claimed is:

1. A module for determining at least one reference speed value, $v_{ref}$ of a vehicle, for a control system of the vehicle, the module comprising:
   an input unit configured to receive a set speed $v_{set}$ for the vehicle;
   a horizon unit configured to determine a horizon for an itinerary by reference to map data and location data which comprise route segments, each route segment having at least one route characteristic for each segment;
   a calculation unit configured to perform a number of simulation cycles, wherein each simulation cycle $s_j$ includes a number N of simulation steps conducted at a predetermined rate f, the simulation steps comprising:
      a first prediction of a speed $v_{pred\_cc}$ of the vehicle along the horizon according to the set speed $v_{set}$ imparted as the reference speed $v_{ref}$, the first prediction depending on a route characteristic of said route segment;
      a first comparison of the speed $v_{pred\_cc}$ with at least one of first lower and upper limit values $v_{lim1}$ and $v_{lim2}$, wherein the first lower and upper limit values $v_{lim1}$ and $v_{lim2}$ define an engine torque T for use in an immediately following simulation cycle $s_{j+1}$;
      a second prediction of a speed $v_{pred\_Tnew}$ of the vehicle along the horizon when the engine torque T is a value which depends on the result of the first comparison in an immediately preceding simulation cycle $s_{j-1}$;
      a second comparison of a second predicted speed $v_{pred\_Tnew}$ of the vehicle with at least one of second lower and upper limit values $v_{min}$ and $v_{max}$, wherein the second lower and upper limit values $v_{min}$ and $v_{max}$ delineate a range width within which the speed of the vehicle is maintained; and
      determining the at least one reference value $v_{ref}$ based on the second comparison and/or the second predicted vehicle speed $V_{pred\_Tnew}$ in this simulation cycle $s_j$, the set speed $v_{set}$ being within the range width bounded by the second lower and upper limit values $v_{min}$ and $v_{max}$; and
   a providing unit configured to supply the control system of the vehicle with the $v_{ref}$ for regulating the speed of the vehicle.

2. A module according to claim 1, wherein the calculation unit is configured such that the second lower and upper limit values $v_{min}$ and $v_{max}$ for the range width are set manually by the driver via the input unit.

3. A module according to claim 1, wherein a predetermined number of different range widths are defined for the range within which the vehicle is maintained.

4. A module according to claim 3, wherein in the second comparison, the second lower and upper limit values $v_{min}$ and $v_{max}$ for each range width take the form of a first and a second predetermined number of km/h below and above, respectively, the set speed $v_{set}$.

5. A module according to claim 3, wherein the second lower and upper limit values $v_{min}$ and $v_{max}$ for each range width take the form of a first and a second predetermined percentage below and above, respectively, the set speed $v_{set}$.

6. A module according to claim 1, wherein in the second comparison, the second lower and upper limit values $v_{min}$ and $v_{max}$ are set automatically based on calculations of appropriate range widths.

7. A module according to claim 6, wherein in the second comparison, the range width is adjusted automatically based on a time gap to a vehicle ahead so that the range width is smaller for a short time gap and larger for a longer time gap.

8. A module according to claim 1, wherein in the second comparison, the calculation unit assesses whether the second predicted vehicle speed $V_{pred\_Tnew}$ fulfils at least one of the following criteria:
   the predicted vehicle speed $v_{pred\_Tnew}$ being below or equal to the second upper limit value $v_{max}$, i.e. $v_{pred\_Tnew} \leq v_{max}$; and
   the predicted vehicle speed $v_{pred\_Tnew}$ being above or equal to the second lower limit value $v_{min}$, i.e. $v_{pred\_Tnew} \geq v_{min}$.

9. A method for determining at least one reference value $v_{ref}$ for a control system of a vehicle, the method comprising:
   acquiring a set speed $v_{set}$ for the vehicle;
   determining a horizon for an itinerary by reference to map data and location data, wherein horizon comprises one or more route segments, each route segment having at least one route characteristic;
   performing, by a module including an automated processor, a plurality of simulation cycles, wherein each simulation cycle $s_j$ comprises a number N of simulation steps conducted at a predetermined rate f, the simulation steps including:
      making a first prediction of the vehicle's speed $v_{pred\_cc}$ along the horizon according to a conventional cruise control when the set speed $v_{set}$ is imparted as a reference speed $v_{ref}$, wherein the first prediction depends on the characteristics of the route segment;
      making a first comparison of the first predicted vehicle speed $v_{pred\_cc}$ with at least one of first lower and upper limit values $v_{lim1}$ and $v_{lim2}$, wherein the first lower and upper limit values $v_{lim1}$ and $v_{lim2}$ define an engine torque T for use in an immediately following simulation cycle $s_{j+1}$;
      making a second prediction of the vehicle's speed $v_{pred\_Tnew}$ along the horizon when the vehicle's engine torque T is a value which depends on the result of the first comparison in an immediately preceding simulation cycle $s_{j-1}$;
      making a second comparison of the second predicted vehicle speed $v_{pred\_Tnew}$ with at least one of second lower and upper limit values $v_{min}$ and $v_{max}$, wherein the lower and upper limit values $v_{min}$ and $v_{max}$ delineate a range within which the speed of the vehicle is maintained; and
      determining the at least one reference value $v_{ref}$ along the horizon based on the second comparison and/or the second predicted vehicle speed $v_{pred\_Tnew}$ in the simulation cycle $s_j$, the set speed being within a range bounded by the second lower and upper limit values $v_{min}$ and $v_{max}$; and
   providing the control system of the vehicle with the at least one reference value $v_{ref}$ and regulating the speed of the vehicle according to the least one reference value $v_{ref}$.

10. A method according to claim 9, wherein the second lower and upper limit values $v_{min}$ and $v_{max}$ for the range width are set manually by a driver via the input unit.

11. A method according to claim 9, wherein a predetermined number of different range widths are defined for the range.

12. A method according to claim 11, wherein the second lower and upper limit values $v_{min}$ and $v_{max}$ for each range width take the form of a first and a second predetermined number of km/h below and above, respectively, the set speed $v_{set}$.

13. A method according to claim 11, wherein the second lower and upper limit values $v_{min}$ and $v_{max}$ for each range width take the form of a first and a second predetermined percentage below and above, respectively, the set speed $v_{set}$.

14. A method according to claim 9, wherein the second lower and upper limit values $v_{min}$ and $v_{max}$ are set automatically based on calculations of range widths.

15. A method according to claim 14, wherein the range width is adjusted automatically based on a time gap to a vehicle ahead so that the range width is smaller for a shorter time gap and larger for a longer time gap.

16. A method according to claim 9, wherein said second comparison assesses whether the second predicted vehicle speed $v_{pred\_Tnew}$ fulfils at least one of the following criteria:
the predicted vehicle speed $v_{pred\_Tnew}$ is below or equal to the second upper limit value $v_{max}$, i.e. $v_{pred\_Tnew} < v_{max}$; and
the predicted vehicle speed $v_{pred\_Tnew}$ is above or equal to the second lower limit value $v_{min}$, i.e. $v_{pred\_Tnew} < v_{min}$.

17. A method according to claim 9, wherein the vehicle comprises at least one control unit and a non-transitory computer-readable medium comprising a computer program, the computer program comprising program code wherein when the program code is executed by a processor of the at least one control unit, the at least one control unit performs the method for determining at least one reference value $v_{ref}$ for the control system of the vehicle according to claim 9.

18. A vehicle including the module of claim 1.

* * * * *